(12) United States Patent
Spruill et al.

(10) Patent No.: US 11,470,850 B2
(45) Date of Patent: Oct. 18, 2022

(54) FUNNEL CAKE BATTER DISPENSER WITH IMPROVED DISPENSING GUN WITH WAND AND BATTER CONTAINER

(71) Applicants: Gary Rayford Spruill, Enid, OK (US); Jo Ann Spruill, Enid, OK (US)

(72) Inventors: Gary Rayford Spruill, Enid, OK (US); Jo Ann Spruill, Enid, OK (US)

( * ) Notice: Subject to any disclaimer, the term of this patent is extended or adjusted under 35 U.S.C. 154(b) by 15 days.

(21) Appl. No.: 16/880,817

(22) Filed: May 21, 2020

(65) Prior Publication Data
US 2020/0375197 A1    Dec. 3, 2020

Related U.S. Application Data

(60) Provisional application No. 62/853,539, filed on May 28, 2019.

(51) Int. Cl.
*A21C 5/00* (2006.01)

(52) U.S. Cl.
CPC .................................. *A21C 5/006* (2013.01)

(58) Field of Classification Search
CPC .. A23G 3/0027; A23G 3/0029; A23G 3/0257; A21C 5/006; A21C 5/03; B05B 9/007; B67D 1/0418; B67D 7/845
USPC ................................ 222/399, 529, 394, 608
See application file for complete search history.

(56) References Cited

U.S. PATENT DOCUMENTS

| | | | |
|---|---|---|---|
| 1,563,609 A * | 12/1925 | Zerk | F16N 5/00 222/25 |
| 2,149,633 A * | 3/1939 | Schnoor | B67D 1/0468 137/192 |
| 4,083,296 A * | 4/1978 | Mede | A21B 5/03 99/423 |
| 5,772,075 A * | 6/1998 | Ash, Jr | B67D 1/04 222/1 |
| 6,216,921 B1 * | 4/2001 | Spruill | A21C 5/006 222/399 |
| 6,422,421 B1 * | 7/2002 | Freudinger | B67D 1/0005 222/529 |
| 6,926,170 B2 * | 8/2005 | Groesbeck | B67D 1/0021 222/105 |
| 6,945,438 B1 * | 9/2005 | Shih | A01M 7/0035 222/186 |
| 8,091,378 B1 * | 1/2012 | Farias, III | B67D 1/0418 62/389 |
| 2010/0075001 A1 * | 3/2010 | Succar | B65D 47/2018 426/115 |
| 2010/0108708 A1 * | 5/2010 | Wawzynski | A21C 5/006 222/1 |
| 2019/0142016 A1 * | 5/2019 | Blachere | A21C 5/006 99/334 |
| 2020/0383338 A1 * | 12/2020 | Daubertais | A21C 5/006 |

* cited by examiner

*Primary Examiner* — Charles P. Cheyney
(74) *Attorney, Agent, or Firm* — Hall Estill Law Firm

(57) ABSTRACT

A funnel cake batter or other batter container with a stop-flow ball to prevent the discharging of $CO_2$ gas into the cooking oil, a convex shaped bottom with a centered hole for improved emptying of the batter container, an easier to operate hand-held, trigger-activated dispensing gun wand, a "J" hook to hang the dispensing gun wand on when not in use, and a cast iron stand with four legs and four caster wheels making the batter container movable within a place of operation.

19 Claims, 7 Drawing Sheets

FUNNEL CAKE BATTER DISPENSER WITH IMPROVED DISPENSING GUN WITH WAND AND BATTER CONTAINER

CROSS-REFERENCE TO RELATED APPLICATIONS

A Funnel Cake Batter Dispenser is described in the prior art, U.S. Pat. No. 6,216,921, Apr. 17, 2001, Paul R. Spruill.

FIELD OF THE INVENTION

This invention generally relates to batter dispensers, and more specifically to a batter container capable of dispensing funnel cake batter and other batters using a hand-held, trigger-activated, batter dispensing gun with wand, and an improved pressurized, batter container with a stop-flow ball which prevents accidental discharge of $CO_2$ (Carbon Dioxide) gas.

BACKGROUND OF THE INVENTION

A Funnel Cake Batter Dispenser is described in the prior art, U.S. Pat. No. 6,216,921, Paul R. Spruill.

DESCRIPTION OF PRIOR ART

The present invention solves known problems with the Funnel Cake Batter Dispenser, U.S. Pat. No. 6,216,921. Those problems solved are: 1.) A user can operate a hand-held, trigger-activated, batter dispensing gun with wand with one hand instead of requiring two hands to manually turn the FIP Ball valve as described in the prior art U.S. Pat. No. 6,216,921, Paul R. Spruill;

2.) A stop-flow ball prevents the spitting of $CO_2$ gas out of the hand-held, trigger-activated, batter dispensing gun with wand, of the present invention, when the batter container is empty of batter. Wherein, the prior art U.S. Pat. No. 6,216,921, Paul R. Spruill, there is no method or mechanism to stop $CO_2$ from spitting out when the batter container is empty. Thus, increasing the possibility of a user being burned by hot oil splashing up from the cooker when the $CO_2$ gas spits.

In the present invention, with the hole being moved to the bottom of the batter container, which is convex in shape, instead of being on the side as known in the prior art, allows a hollow, plastic, shut-off ball, which floats on top of the batter then floats down to the hole at the bottom of the batter container, to seal off the batter container when the batter is emptied. This hollow, plastic, shut-off ball prevents a user from dispensing $CO_2$ gas into the hot cooking oil which can cause splatters and severe burns. Although, the $CO_2$ acts as a blanket of pressure on top of the batter pushing the batter out of the batter container into the hand-held, trigger-activated, dispensing gun with wand the hole located at the bottom of the batter container is aided by gravity, as well, in emptying;

3.) A metal stand with four legs and caster wheels which better supports the weight of the batter container when filled with batter, and the caster wheels makes it easier to move the batter container filled with batter in the area of operation;

4.) A drip cap for the end of the wand on the hand-held, trigger-activated, dispensing gun with wand prevents batter from dripping out the end of it when the batter container is pressurized and filled and not in use;

5.) A valve connected to the convex, bottom hole of the canister which allows the canister to completely empty out of batter. In the present invention, with the hole being moved to the bottom of the batter container instead of on the side as known in the prior art. In the prior art U.S. Pat. No. 6,216,921, Paul R. Spruill, when the batter was nearing empty in the batter container it had to be picked up and tipped sideways to be completely emptied. In the present invention, the $CO_2$ gas which pressurizes and pushes the batter out combined with gravity flow allows the batter container to empty fully.

6.) A J-hook for hanging the trigger-activated, batter dispensing gun with wand allows a user a place to hang the batter dispensing gun with wand when not in use.

SUMMARY OF THE INVENTION

In accordance with the present invention, an apparatus is provided for dispensing funnel cake batter or other batter into hot cooking oil in a safe and controlled fashion. A hand-held, trigger-activated batter dispensing gun is coupled to a batter container that can be completely emptied of batter. The batter container includes a stop-flow ball which prevents the accidental spitting of $CO_2$ gas into the hot cooking oil. A drip cap may be provided for the end of the wand which prevents batter from dripping when the batter container is filled with batter. A and a stand with caster wheels can be used to support the batter container when filled with batter and makes the batter container easier to move from one location to another in an area of operation.

DRAWING FIGURES

The drawings show the present invention which is an apparatus comprising an assemblage, namely:

Figure 1:
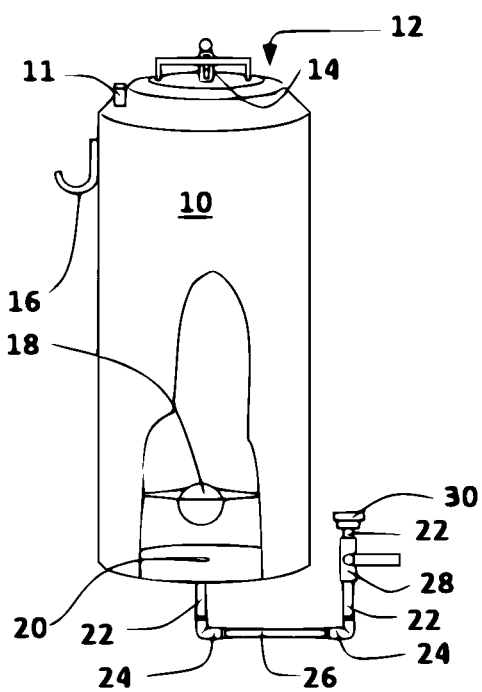
FIG. 1 shows a cut-away view a batter container with batter and a shut-off ball floating on the batter, and shows a cast iron stand with caster wheels.
Figure 1:
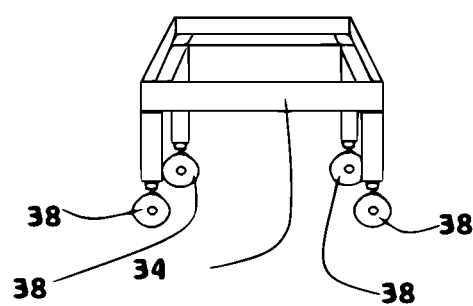

REFERENCE NUMERALS IN DRAWINGS 10 stainless steel, batter container,
11 inlet pressure, gas valve,
12 stainless steel, batter container lid,
14 pressure release valve,
16 stainless steel "J" hook,
18 food grade stop-flow, plastic, hollow ball,
20 ½" diameter hole,
22 (3) ½"×1½" stainless steel nipples,
24 (2) ½" stainless steel elbows,
26 ½"×8" stainless steel nipple,
28 ½" stainless steel FIP Ball Valve,
30 female half of a stainless steel union, 32 male half of a stainless steel union,
34 10"×10"×10", cast iron stand with caster wheels,
36 threaded hole in stainless steel, batter container for inlet pressure, gas valve,
38 (4) caster wheels,
40 (2) ½" plastic pipe to ½" metal pipe Stainless steel Male Adaptor,
42 (2) ⅝" stainless steel clamps,
44 ½" (½" I.D.×⅝" O.D.) Clear Plastic tubing, approximate length 10', however, length can vary length depending on area of operation,
46 stainless steel, hand-held, trigger activated dispensing gun with wand,
48 ½"×8" stainless steel tube with a 45 degree bend 4.5" from one end,
50 ⅝" removable drip cap made of rubber or plastic,
51 threaded hole for pressure release valve to screw into batter container lid,
52 black rubber sealing ring for stainless steel batter container lid,
54 convex bottom of stainless steel batter container.

DETAILED DESCRIPTION

Figure 2:
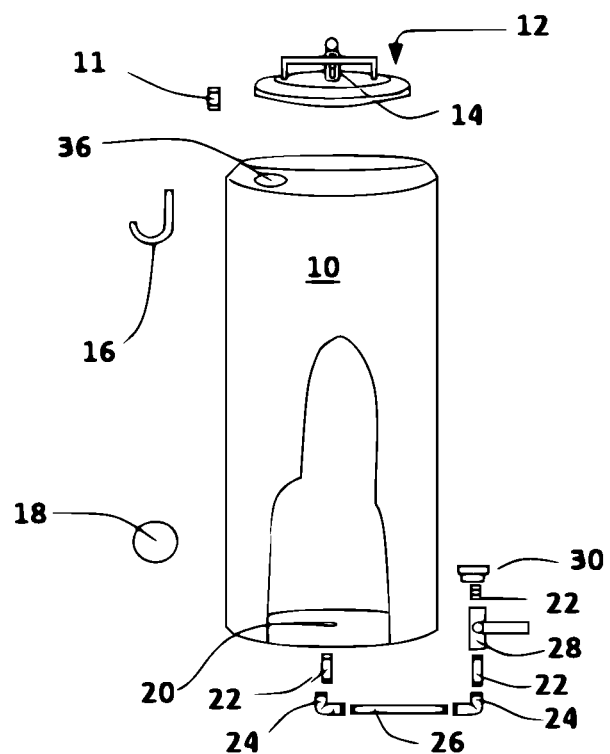
FIG. 2 shows a cut-away view and integral parts comprising the assemblage and shows a cast iron stand with caster wheels.
Figure 2:
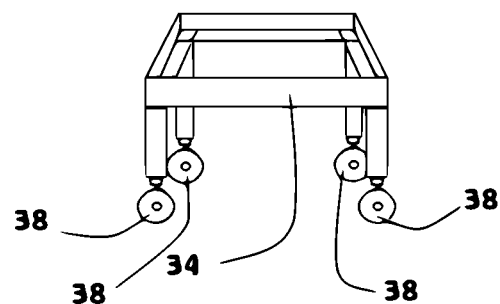

FIG. 1 shows a cut-away view of the assemblage and the integral parts interconnected which comprise the present invention, and shows a cast iron stand with caster wheels 34 of the present invention. In the cut-away view a stainless steel batter container 10 is shown with a shut-off, plastic, hollow ball 18 floating in the batter. An inlet pressure valve, gas valve 14 is shown for receiving CO2 gas. A stainless steel, batter container lid 12 batter container 10. A stainless steel "J" hook 16 is shown affixed or welded to the stainless steel batter container 10. A ½" diameter hole 20 is shown in the convex bottom of the stainless steel batter container 10 with a ½"×1½" stainless steel nipple 22 affixed or silver soldered to the exterior, bottom of the stainless steel batter container 10. The ½"×1½" stainless steel nipple 22 is interconnected to a ½" stainless steel elbow 24 which is interconnected to a ½"×8" stainless steel nipple 26 which is interconnected to second ½" stainless steel elbow 24 which is interconnected to a second ½" stainless steel nipple 22. The second ½" stainless steel nipple 22 is interconnected to a ½" stainless steel FIP Ball valve 28 which is interconnected to a third ½" stainless steel nipple 22 which is interconnected to a female half of a stainless steel union 30. FIG. 2 shows a cut-away view of the assemblage and the integral parts disconnected which comprise the present invention: a stainless steel batter container 10, a stainless steel, batter container lid 12, An inlet pressure valve, gas valve 14, a stainless steel "J" hook 16, a stop-flow, plastic, hollow ball 18, a ½" diameter hole 20, (3) ½"×1½" stainless steel nipples 22, (2) ½" stainless steel elbows 24, ½"×8" stainless steel nipple 26, a ½" stainless steel FIP Ball Valve 28, a female half of a stainless steel union 30, and a 10"×10"×10", cast iron stand with caster wheels 34.

Figure 3:
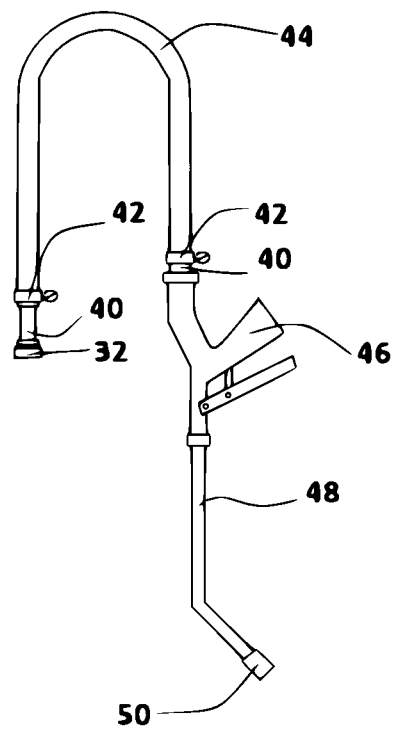
FIG. 3 shows a view of a hand-held, trigger-activated dispensing gun with wand.

FIG. 3 shows a view of the hand-held, trigger-activated dispensing gun with wand and the integral parts which further comprise the present invention. A male half of a stainless steel union 32 is interconnected to a ½" plastic pipe to ½" metal pipe stainless steel male adaptor 40, which is interconnected to a ½" (½" I.D.×⅝" O.D.) clear plastic tubing 44, approximate length 10', however, length can vary length depending on area of operation which is secured to the ½" plastic pipe to ½" metal pipe stainless steel male adaptor 40 by a ⅝" stainless steel clamp 42. The second end of the ½" (½" I.D.×⅝" O.D.) clear plastic tubing 44 is interconnected to a second ½" plastic pipe to ½" metal pipe stainless steel male adaptor 40 which is secured to the ½" plastic pipe to ½" metal pipe stainless steel male adaptor 40 by a second ⅝" stainless steel clamp 42. The second end of the second ½" plastic pipe to ½" metal pipe stainless steel male adaptor 40 is interconnected to a hand-held, trigger-activated gun 46 which is interconnected to a ½"×8" stainless steel tube wand 48 with a 45 degree bend 4.5" from one end distal to the hand-held, trigger-activated gun 46, and a ⅝" removable drip cap 50 made of rubber or plastic is placed on the end of the ½"×8" stainless steel tube wand 48 when not in use.

Figure 4:
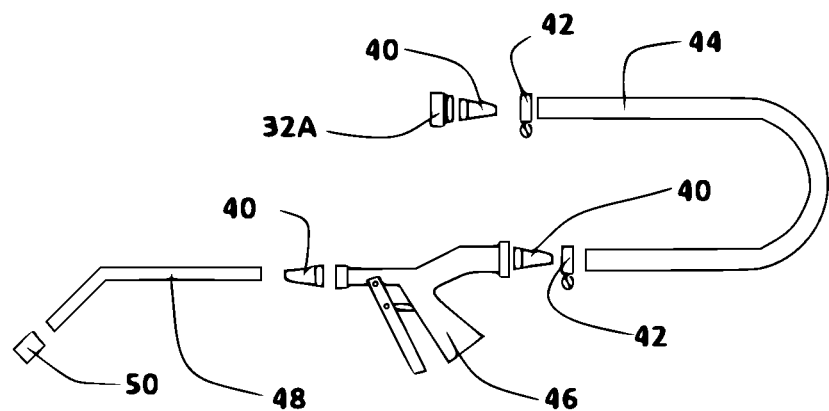
FIG. 4 shows a view of integral parts comprising the hand-held, trigger-activated dispensing gun with wand.

FIG. 4 shows a view of the hand-held, trigger-activated dispensing gun with wand and the integral parts disconnected. A male half of a stainless steel union 32, (3) ½" plastic pipe to ½" metal pipe stainless steel male adaptors 40, and the third ½" plastic pipe to ½" metal pipe stainless steel male adaptor 40 is interconnected between the hand-held, trigger-activated gun 46 and the ½"×8" stainless steel tube wand 48. (2) ⅝" stainless steel clamps 42, a ½" (½" I.D.×⅝" O.D.) clear plastic tubing 44, and a ⅝" removable drip cap 50.

Figure 5:
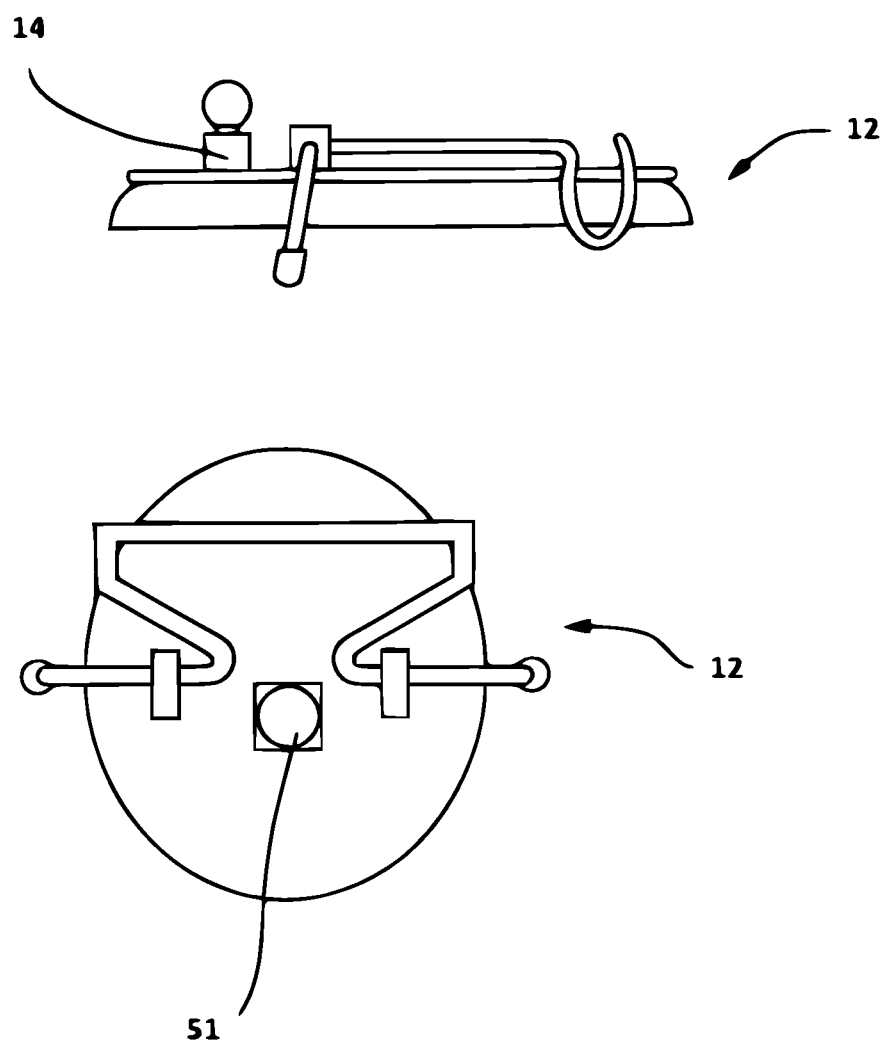
FIG. 5 shows two views of a pressurized, batter container lid.

FIG. 5 shows two views of the stainless steel, batter container lid 12. The top view shows the stainless steel, batter container lid 12 with the pressure release valve 14. The bottom view shows the stainless steel, batter container lid 12 with a threaded hole 51.

Figure 6:
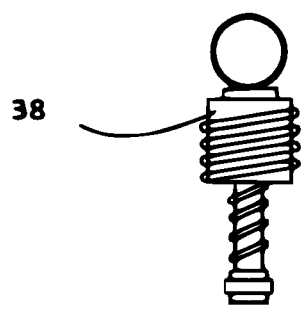
FIG. 6 shows a view of a pressure release valve, and a black rubber sealing ring for a pressurized, batter container lid.
Figure 6:
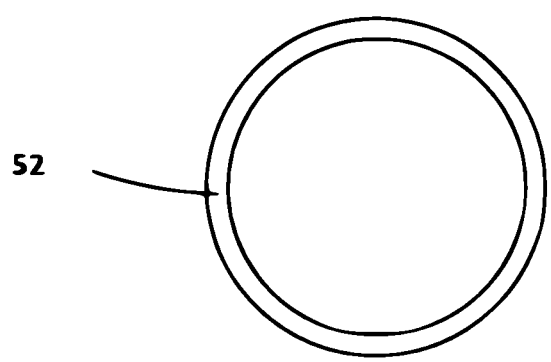

FIG. 6 shows a view of a pressure release valve 14 and a black rubber sealing ring for stainless steel batter container lid 52.

Figure 7:
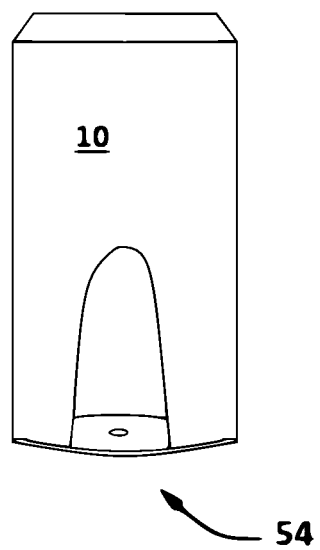
FIG. 7 shows a cut-away view of a pressurized, batter container with a convex bottom.

FIG. 7 shows a view of the convex bottom 54 the stainless steel batter container 10.

We claim:

1. An apparatus comprising:
    a batter container comprising a generally cylindrical vessel having a top, a convex bottom and a side wall defining an interior chamber, the vessel further comprising a vessel opening;
    a closure lid removably and sealingly mounted adjacent said vessel opening to facilitate filling the interior chamber with a batter;
    a pressure release valve in communication with said interior chamber to release excess pressure therein;
    an inlet pressure valve in communication with said interior chamber and adapted to be connected with a gas pressurizing source to create a positive pressurization of the batter contained in said interior chamber;
    a conduit coupled to a dispensing hole centered in said convex bottom of said batter container allowing communication with said interior chamber for permitting flow of said batter there-through;
    a ball configured to sealingly cover the dispensing hole in an absence of the batter within the interior chamber, wherein the interior chamber of the vessel has an overall interior first diameter, the ball has an overall exterior second diameter, and the first diameter is at least three (3) times larger than the second diameter;
    a hand-held, trigger-activated gun with a dispensing wand removably connected to said batter container via the conduit; and
    a support stand configured to support the batter container above a floor surface to provide clearance for a first portion of the conduit extending from the dispensing hole.

2. The apparatus of claim 1, wherein the conduit comprises a ball valve to shut-off or regulate a flow of the batter from the batter container to the gun.

3. The apparatus of claim 2, wherein the first portion of the conduit is formed of metal and extends between the batter container and the ball valve, and wherein the conduit further comprises a second portion of the conduit that extends between the valve and the gun.

4. The apparatus of claim 3, wherein the second portion of the conduit comprises a flexible tube of selected length.

5. The apparatus of claim 1, wherein the vessel and the closure lid are each formed of stainless steel.

6. The apparatus of claim 1, wherein the support stand comprises a metal stand with a support platform portion adapted to receivingly engage a bottom portion of the batter container, a plurality of support legs extending downwardly from the support platform portion, and a corresponding plurality of casters coupled to the respective support legs.

7. The apparatus of claim 1, further comprising a hook affixed to an exterior surface of the batter container configured to support the gun when not in use.

8. The apparatus of claim 1, wherein the ball is a food grade stop-flow plastic hollow ball.

9. The apparatus of claim 1, wherein the dispensing hole has an overall interior third diameter, and wherein the third diameter is less than the second diameter sufficient to enable the ball to sealingly cover the dispensing hole when all of the batter has been dispensed from the interior chamber.

10. The apparatus of claim 1, wherein the convex bottom comprises an exterior surface and a corresponding interior surface with a nominally uniform wall thickness therebetween over an entirety of the convex bottom, the interior surface continuously sloping toward the centrally located dispensing hole, the dispensing hole formed by an annular interior sidewall which extends from the exterior surface to the interior surface over the nominally uniform wall thickness therebetween to facilitate emptying of substantially all of the batter from the interior chamber.

11. The apparatus of claim 10, wherein the ball is configured to be laterally translated along the sloped interior surface as the batter is dispensed to come to rest in sealing relation to the dispensing hole once all of the batter from the interior chamber has been dispensed.

12. The apparatus of claim 1, wherein the gun is configured to be operated using a single hand of the user through respective activation and deactivation of a trigger portion of the gun.

13. An apparatus comprising:
a batter container comprising a substantially cylindrical, pressurizable vessel defining an interior space configured to receive a volume of batter, the vessel having a contoured interior bottom surface that slopes to a centrally located dispensing hole extending through the vessel at a lowest elevation of the interior space;
a gas injection port to facilitate pressurization of a vapor space within the interior space above the volume of batter disposed therein to pressurize said volume of batter with an injected gas from a source;
a ball having a selected buoyancy relative to the volume of batter to cause the ball to be supported thereby within the interior space, the ball further having an overall diameter sufficient to move laterally with respect to the contoured interior bottom surface as the batter flows through the dispensing hole and to sealingly cover the dispensing hole once all of the volume of batter has been dispensed;
a conduit assembly which couples the dispensing hole to a hand-held dispensing gun to facilitate selectable flow of the batter from the vessel;
a support stand which supports the batter container above a floor surface a sufficient vertical distance to provide clearance for an upstream portion of the conduit assembly that extends downwardly from the dispensing hole; and
wherein the overall diameter of the ball is less than 33% of an overall interior diameter of the interior space of the vessel.

14. The apparatus of claim 13, wherein the conduit assembly further comprises a ball valve operable by a user to selectively shut-off or regulate a flow of the batter to the gun.

15. The apparatus of claim 14, wherein the upstream portion of the conduit assembly comprises metal tubing that extends between the vessel and the ball valve, and wherein the conduit assembly further comprises a downstream portion of the conduit comprising a length of flexible tubing extending between the ball valve and the gun.

16. The apparatus of claim 15, wherein the upstream portion of the conduit comprises a first extent that extends downwardly from the dispensing hole, a second extent that extends horizontally to a location beyond an outermost diameter of the vessel, and a third extent that extends upwardly so that nominally 90 degree bends are provided between the first and second extents and between the second and third extents.

17. The apparatus of claim 13, wherein the gun is configured to dispense the batter via a single hand of a user by activation of a trigger of the dispensing gun.

18. The apparatus of claim 13, wherein the vessel is formed of stainless steel.

19. The apparatus of claim 13, wherein the injected gas is carbon dioxide ($CO_2$).

* * * * *